No. 868,164. PATENTED OCT. 15, 1907.
W. W. DOOLITTLE.
STEAM SEPARATOR.
APPLICATION FILED FEB. 7, 1905.

WITNESSES:

INVENTOR.
William W. Doolittle
BY
Paul Synnestvedt
ATTORNEY.

No. 868,164. PATENTED OCT. 15, 1907.
W. W. DOOLITTLE.
STEAM SEPARATOR.
APPLICATION FILED FEB. 7, 1905.
2 SHEETS—SHEET 2.
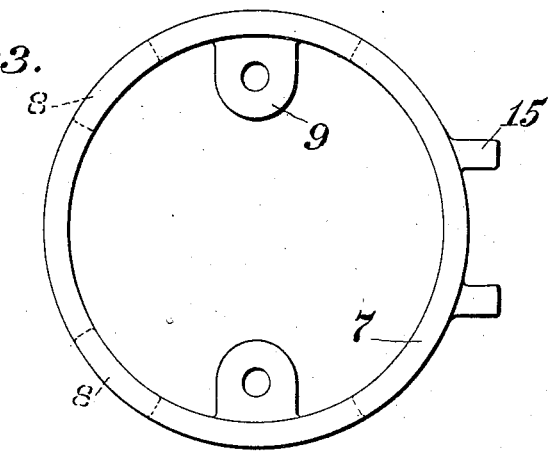
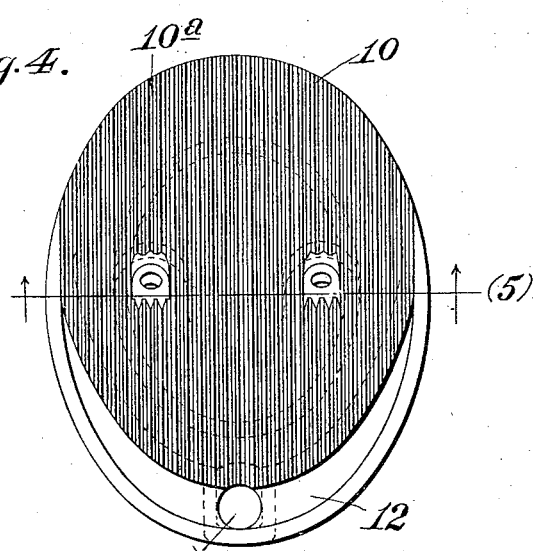
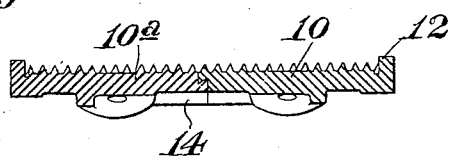
WITNESSES:
INVENTOR.
William W. Doolittle
BY
Paul Synnestvedt
ATTORNEY.

UNITED STATES PATENT OFFICE.

WILLIAM W. DOOLITTLE, OF CHICAGO, ILLINOIS, ASSIGNOR TO CRANE COMPANY, OF CHICAGO, ILLINOIS, A CORPORATION OF ILLINOIS.

STEAM-SEPARATOR.

No. 868,164.　　　　Specification of Letters Patent.　　　　Patented Oct. 15, 1907.

Application filed February 7, 1905. Serial No. 244,644.

*To all whom it may concern:*

Be it known that I, WILLIAM W. DOOLITTLE, a citizen of the United States, residing at Chicago, in the State of Illinois, have invented certain new and useful Improvements in Steam-Separators, of which the following is a specification.

My invention relates to means for separating suspended fluids from vapors or gases, as the water in steam under pressure, or oil in exhaust steam, etc., and particularly to the construction of vertical separators. The objects of the invention are to improve and simplify the construction of such separators by casting the casing parts in one piece; to make a removable baffle plate and design the casing for readily setting such baffle plate therein; to avoid the use of joints in such separator casings, better support the baffle plate, and to generally improve the construction and operation. These objects, and others hereinafter to appear, I attain by means of the structure illustrated in preferred form in the accompanying drawings, wherein—

Figure 3 is a top plan view of the outlet pipe 7 of Figure 1, with the baffle plate removed;

Figure 4 is a plan view of the two-part baffle plate, and

Figure 5 is a cross section of the same on line (5) of Figure 4.

It has been customary to make vertical separators in two pieces in order to properly insert the baffle plate, but this is open to objection because a gasketed joint is required which is liable to leak, and when the gasket gives out a new one cannot be inserted without removing the separator from the line or taking down a portion of the piping. Attempts have been made to make the entire separator in one casting including the baffle plate, but this is objectionable because the soundness of the casting cannot be determined and the plate cannot be removed or cleaned when desired. I overcome these difficulties by casting the entire separator casing and the outlet pipe in one piece and putting in the baffle plate separately, making it in two parts for this purpose.

Figure 1:
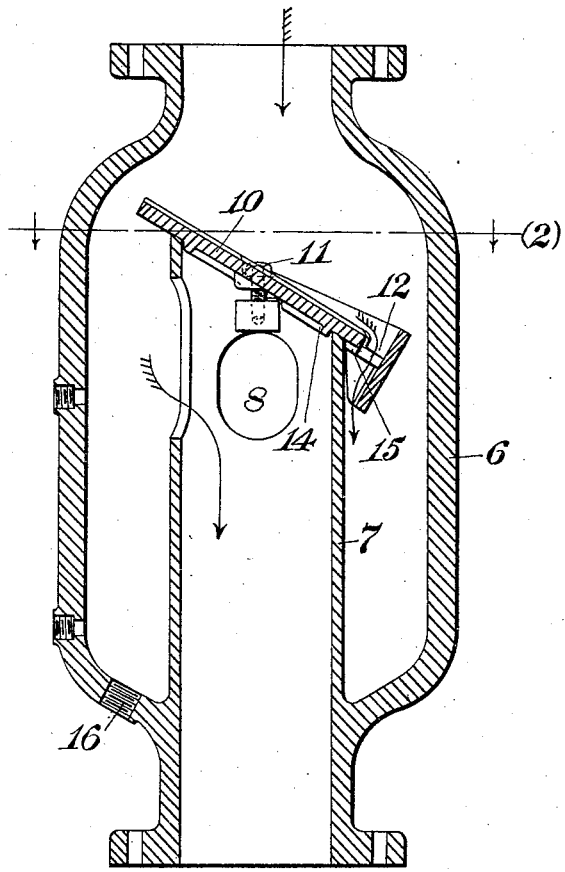
Figure 1 is a vertical central section through the separator with the baffle plate in place.
Figure 2:
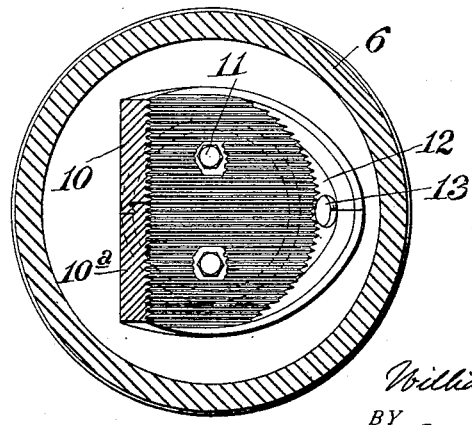
Figure 2 is a horizontal section on the line (2) of Figure 1.

In the accompanying drawings it will be seen that the casing 6 is provided with an inwardly extended pipe 7, forming the outlet for the steam, and provided with openings 8 for this purpose. The top of the pipe 7 is formed at an angle with the vertical, as shown in Figure 1, and has inwardly projecting lugs 9 and also guide lugs 15 upon the outside. On top of this I put the baffle plate, which is composed of the two parts 10 and 10ª, formed with corrugated upper surfaces and fitted together on a splice joint as shown in Figure 5. The outer edge has an annular flange 12 for drainage, having an opening 13 to allow the escape of the water or other fluid therein. The baffle plate is made oval and it is put in place by dropping one-half of it at a time through the inlet opening at the top of the casing, and securing it to the lug 9 by means of screw 11, as will be plain from the figures, the baffle plate being provided with an annular depending flange 14 to register it in place, and engaging also against the lugs 15. The casing 6 has outlets 16, as may be desired to drain off the fluid separated from the steam or other gases escaping through the outlet pipe 7.

It will be seen that this structure enables the casting of the outer shell and the internal outlet pipe in one piece, thus doing away with the objectionable joints in the body, and allowing of the removable baffle plate being put in after the casting has been cleaned and inspected. The baffle plate also may readily be inspected and cleaned before placing it. The setting of the baffle plate at an angle to the incoming current of steam is also advantageous as allowing easy drainage and giving greater surface for separating the suspended fluid from the steam or other gases. The ribbed structure also prevents the current of gas from taking up the deposited globules thereon, and the form of the casing furthermore prevents the possibility of the outgoing current of steam picking up any of the fluid as it is drained into the well. Other advantages of the device will be readily apparent to those familiar with the art.

Having thus described my invention and illustrated its use, what I claim as new and desire to secure by Letters Patent, is the following:

1. In combination, a vertical closed casing having an inlet opening at its upper end and an outlet pipe extending inwardly from its lower end, an independent baffle plate immediately below the inlet opening, and means below and accessible from such inlet opening for detachably securing the baffle plate to the upper end of the outlet pipe.

2. In combination, a vertical closed casing having an inlet opening at its upper end, and an outlet pipe extending inwardly from the opposite end, an independent baffle plate immediately below the inlet opening and provided with a projecting means on its under side for engaging the pipe whereby the plate is positioned on the end of the outlet pipe, and additional means for securing the plate to the outlet pipe.

3. In a steam separator the combination of a casing having an integral outlet pipe adapted to support the baffle plate and a sectional baffle plate attached on said pipe.

4. In a steam separator the combination of a casing having an inlet and an inwardly projecting integral steam outlet pipe, a removable baffle plate on said pipe and a drainage ledge 12 on the baffle plate with a flange to intercept currents of steam on the surface of the condensed water thereon.

5. A separator comprising in combination a closed casing having an inlet opening and an inwardly projecting outlet pipe with a side perforation, together with an inclined baffle plate supported upon the end of said outlet pipe, said baffle plate being provided upon one edge, adjacent the closed side of the outlet pipe with a drainage flange.

In testimony whereof I have hereunto signed my name in the presence of the two subscribed witnesses.

WILLIAM W. DOOLITTLE.

Witnesses:
PAUL CARPENTER,
ALBERT GRANT MILLER.